May 22, 1945.   D. N. MUSSEN   2,376,714
WINDSHIELD CLEANER
Filed Feb. 26, 1942
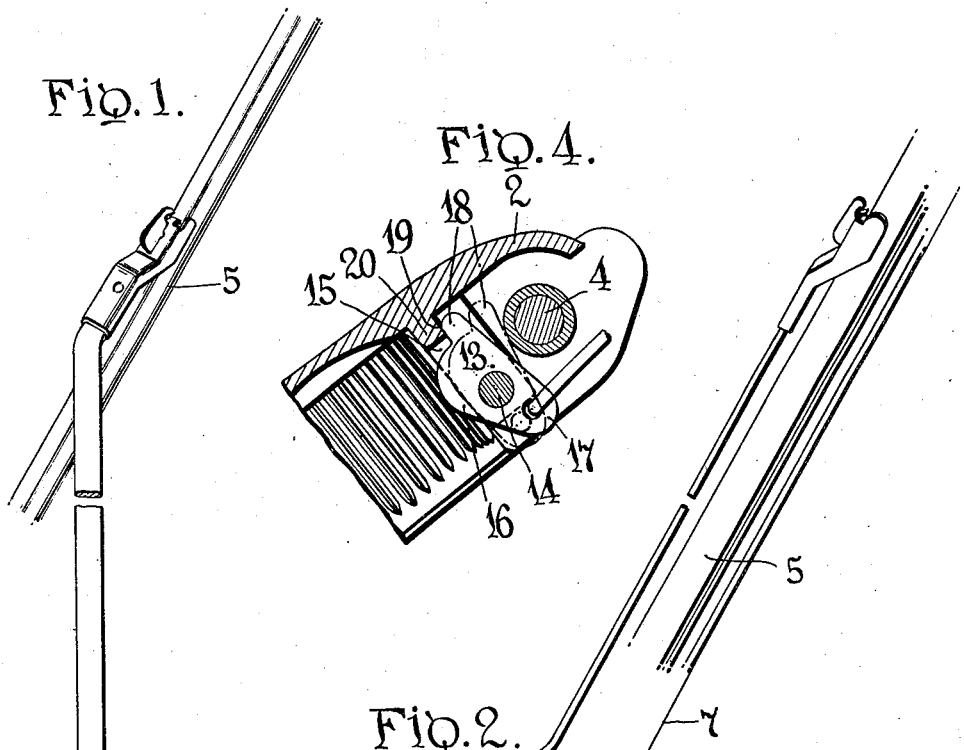
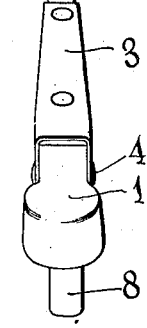
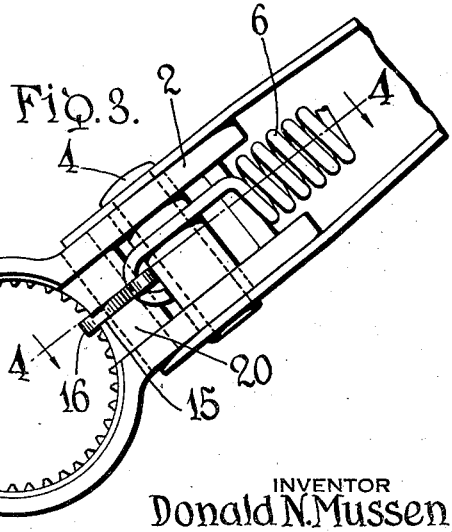
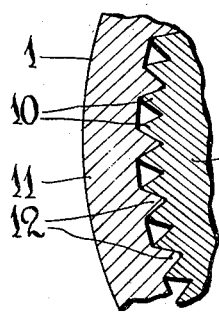
INVENTOR
Donald N. Mussen,
BY
Beau, Brooks, Buckley & Beau.
ATTORNEYS Patented May 22, 1945

2,376,714

UNITED STATES PATENT OFFICE 2,376,714

WINDSHIELD CLEANER

Donald N. Mussen, Williamsville, N. Y., assignor to Trico Products Corporation, Buffalo, N. Y.

Application February 26, 1942, Serial No. 432,432

6 Claims. (Cl. 15—255)

This invention relates to windshield cleaners and primarily to the mounting of the wiper actuating arm on its drive shaft.

In United States Letters Patent No. 2,286,035, granted to Erwin C. Horton and Anton Rappl on June 9, 1942, there is disclosed a construction by which the wiper arm is adjustably mounted on its actuating shaft through interfitting series of teeth on the two parts thereby enabling the path of wiper movement to be located for the best advantage and service on the particular windshield. In the earlier patent the novel construction provided an efficient frictional interengagement for holding the parts together coupled with additional means for positively securing the parts against accidental displacement. The positive securement was effected by a concealed locking means which could be rendered inoperative very readily by an informed person but which might be permanently impaired when forced by an uninformed attendant.

The object of the present invention is to provide a construction in which the wiper arm may be firmly secured in position in a practical manner while permitting the same to be demounted in an expeditious manner when arm replacement or adjustment is necessary. A further object of the invention is to provide a special securement between the arm and its mounting shaft, permitting the arm to be slipped on and off the shaft against a given resistance or securing factor which will increase toward thwarting any attempt to remove the arm in an irregular manner.

In the drawing showing the preferred embodiment of the present invention,

Figs. 1 and 2 are perspective and side elevational views, respectively, of the improved wiper actuating arm in its operative relation to the drive shaft and the wiper;

Fig. 3 is a fragmentary bottom plan view of the shaft attaching end of the arm;

Fig. 4 is a detailed sectional view about on line 4—4 of Fig. 3; and

Fig. 5 is a similar view on an enlarged scale taken about on line 5—5 of Fig. 2.

Referring more particularly to the accompanying drawing which depicts one embodiment of the invention, the numeral 1 designates the shaft engaging section of the wiper arm which has a channeled radial extension 2 to which the blade carried section 3 is pivotally connected by means of the pivot 4. The wiper 5 is attached to the outer end of the arm and urged by a spring 6 into wiping contact with the windshield, generally indicated at 7.

The actuating shaft 8 is provided with a head 9 of generally cylindrical form and has its periphery fluted to provide a multiplicity of fine ribs 10 extending in the direction of the shaft. The mounting section 1 of the wiper arm may be die cast and formed with a socket 11, slightly tapered if desired, designed to receive the head 9. The inner periphery of the socket is formed with a plurality of fine ribs 12 adapted to be selective interengaged with the ribs 10 on the head to enable a multiplicity of small increments of adjustment through which the desired location of the path of the wiper may be secured. Thus the arm may be arranged to the best advantage without having the wiper strike against the windshield frame to mar its finish and create a constant and annoying hammering noise. The ribs on one or the other of the parts 1 and 9 may be reduced in number over those on the companion part and according to the illustrated embodiment the arm ribs 12 are spaced apart to engage every alternate groove on the shaft head 9, as shown in Fig. 5. This mounting of the arm on the shaft provides a certain degree of friction between the engaging teeth which is developed and accentuated by the reaction of the wiper pressure spring 6 in tending to cant the inner arm section relative to the shaft, such frictional securement acting to hold the arm in its proper position.

In the present embodiment means are provided for increasing the frictional securement in a manner which will permit the arm's being removed from the shaft without impairing the efficiency of the securement upon a subsequent replacement. To this end there is provided a friction shoe or latch in the form of a lever 13 pivotally mounted by a pin 14 in a slot 15, which latter extends generally in the direction of the flutes or ribs 12. The shoe forming lever 13 is provided on its inner end with a round nose 16 for frictionally engaging and bearing upon the head 9 when placed therein. This engagement is a yielding one by reason of the wiper pressure spring 6 being anchored to the opposite or outer end of the lever 13, as indicated at 17, and as a means for determining the maximum projection of the nose 16 into the socket the lever is provided with a stop lug or shoulder 18 adapted to engage a shoulder 19 at the inner end of the slot 15. By reason of this depth determining shoulder 18 the nose 16 will be prevented from biting or jamming too deeply into the head 9. Consequently the frictional securement provided by the nose 16 will be determined and sufficient to practically anchor the arm on the shaft while at the same time permit the arm to be lifted off the shaft when it is desired. The slot 15 is formed in a wall 20 which completes the socket formation across the channel of the extension 2, the lever 13 fitting the slot with close tolerance to provide lateral support and a sturdy construction. From Fig. 4 it will be observed that the lug 18 is confined between the shoulders 19 and the pivot pin 4, the broken line showing therein indicating the position in which the friction-gripping nose 16 is wholly retracted from the socket 11 against the urge of the spring 6. The transverse surface of the nose may be flat and of an extent greater than the spacing between adjacent ribs 10 whereby the nose will engage one or two of the ribs at their outer edges. Since the lever 13 has its friction nose 16 extending inwardly from its pivotal axis 14 toward the closed end of the socket the action of the lever will be to bite into the head ribs 10 only as permitted by the shoulders 18 and 19. This firmly secures the arm to the shaft for practical purposes, while at the same time permits the inner arm section 1 being lifted axially from the shaft upon applying a predetermined lifting effort thereto.

To displace the arm from its shaft the head 1 is grasped and lifted axially off the shaft, causing the nose 16 to slide along the engaged rib 10. Any attempt to lift the arm off the head by first swinging the outer blade carrying section 3 about its pivot 4, or in other words lifting the wiper from the glass, will obviously tension the spring 6 and increase the frictional resistance to displacement as provided in the engagement between the nose and the head.

While the foregoing description has been given in detail, it is obvious that the inventive principles involved are capable of assuming other physical embodiments without departing from the spirit or scope of the appended claims.

What is claimed is:

1. A wiper arm comprising a shaft engaging section, a wiper carrying section pivotally connected thereto for movement toward and from an associated windshield, the shaft engaging section having a socket adapted slidably to receive a shaft part, a friction shoe pivotally mounted in the side of the socket and having an inner active end extending inwardly toward the closed end of the socket to bear slidably upon the periphery of such shaft part, and a spring connected at one end to the outer end of the shoe for yieldably projecting said inner active end radially into the socket to frictionally resist withdrawal of the arm when the arm sections are normally related, the opposite end of the spring being connected to the wiper carrying section for providing the wiping pressure at the outer end thereof and adapted to react on the friction shoe with increased pressure when the wiper carrying section is swung outwardly away from the windshield whereby to increase the frictional gripping of the shoe on such shaft part for more securely fastening the arm thereon when the arm sections are abnormally related.

2. A wiper arm comprising a shaft engaging section having a socket adapted to receive a shaft part, a friction shoe carried by the socket wall and having an active face movable radially therefrom into the socket to engage slidably the periphery of such shaft part, means pivotally mounting the shoe for such engagement, the active face of the shoe extending in an arc about the pivotal axis, and means resiliently urging the shoe to its engaging position to increase the frictional contact with such shaft part against free removal while providing yieldable resistance to displacement of the arm.

3. A wiper arm comprising a shaft engaging section having a socket adapted to receive a shaft part, a friction shoe carried by the socket wall and having a nose at its inner end adapted to project into the socket to engage the periphery of such shaft part, means pivotally mounting the shoe at its outer end for such projective movement of the nose, means resiliently urging the shoe to its projecting position, and means carried by and extending outwardly beyond the nose to overhang a fixed part on the shaft engaging section for limiting the degree of projection of the nose into the socket thereby to determine the frictional resistance to displacement of the arm from an associated shaft while preventing the nose of the shoe from biting into the shaft part to a degree prohibitive of arm displacing action.

4. A wiper arm comprising a shaft engaging section having a socket adapted to receive a shaft part having a knurled periphery of longitudinally extending ribs, in combination with such knurled part, a friction shoe pivoted in the socket wall and having an active portion extending inwardly toward the outer end of the shaft part when in engagement with the same, the active portion being curved in the direction of extent of the ribs for binding engagement therewith, and means resiliently holding the active portion in engagement with the ribbed periphery of the shaft part.

5. A wiper arm comprising a shaft engaging section and a wiper carrying section pivotally connected, the shaft engaging section having a socket adapted slidably to receive a shaft part, a friction clutch in the form of a lever, means pivotally mounting the lever for projecting one end into the socket to slidably engage the periphery of the shaft part, and spring means for providing the desired pressure in the wiping contact of an associated wiper at the outer end of the second arm section, said spring means acting on the opposite end of the lever to yieldably hold the first end of the lever projected against the shaft part for frictionally holding the arm normally against displacement while yielding to permit the arm being slid off the arm part, said spring means acting to increase the frictional clutching force of the lever upon movement of the outer end of the second arm section away from an associated windshield whereby to more securely hold the arm against accidental displacement when the arm sections are abnormally related.

6. A wiper arm comprising a shaft engaging section and a wiper carrying section pivotally connected to permit a wiper being lifted from a windshield, the shaft engaging section having a socket adapted slidably to receive a shaft part, a friction clutch carried by the shaft engaging section and frictionally engageable with such shaft part for securing the arm thereon, and means acting on the wiper carrying section to provide normally a wiping pressure for a wiper and reacting upon the clutch normally to secure the arm on the shaft, said last means operable by the wiper carrying section, when the latter is swung to lift a carried wiper from such associated windshield, to increase the frictional gripping of the clutch whereby to more firmly secure the arm on the shaft.

DONALD N. MUSSEN.